United States Patent [19]

Wilson

[11] Patent Number: 4,889,152

[45] Date of Patent: Dec. 26, 1989

[54] SYSTEM FOR AUTOMATICALLY SELECTING AND DISCHARGING A PRESSURIZED CYLINDER

[76] Inventor: Earl L. Wilson, 2163 Hayden Bridge Stub, Springfield, Oreg. 97477

[21] Appl. No.: 302,912

[22] Filed: Jan. 30, 1989

[51] Int. Cl.⁴ .................................... G05D 7/01

[52] U.S. Cl. .................................... 137/113; 137/102

[58] Field of Search .................................... 137/112, 113, 102

[56] References Cited

U.S. PATENT DOCUMENTS 2,641,273 6/1953 Siebens .................... 137/113
2,985,185 5/1961 Morehead .................... 137/113
3,001,541 9/1961 St. Clair .................... 137/113
3,658,081 4/1972 Renaudie .................... 137/113

*Primary Examiner*—Alan Cohan

[57] ABSTRACT

Shut-off valves each in place on a gas cylinder include a spring biased tubular spool also responsive to cylinder pressure. The valves direct a high pressure gas flow from their cylinder to a switching valve. The switching valve has a spring biased spool with axial passageways which serve to communicate one of a pair of inlet ports with an outlet port of the valve to provide a pressurized flow to a carbonator type outlet. Venting of the switching valve, to permit spool shifting, is done remotely by the shut-off valve associated with a partially used cylinder. An indicator gauge on the switching valve identifies which cylinder is in use.

15 Claims, 1 Drawing Sheet

SYSTEM FOR AUTOMATICALLY SELECTING AND DISCHARGING A PRESSURIZED CYLINDER

BACKGROUND OF THE INVENTION

The present invention pertains generally to a system for providing a pressurized gas such as from separate gas cylinders in a pressure range to a single outlet with automatic changeover upon a reduction in cylinder pressure.

In the food service industry, it is the general practice to use tanks or cylinders on a one-at-a-time basis. Reaching of minimum acceptable pressure for carbonating drinks may occur at inconvenient times requiring personnel to interrupt service to customers to make a tank or cylinder substitution assuming a stand-by tank is on hand. The distraction of personnel from their primary task is undesirable. Secondly, to avoid accomplishing tank switching, personnel may continue to use a tank or cylinder when it is below satisfactory pressure. Weekly servicing of pressurized tanks has been proposed as a solution to the problem, but such servicing incurs a service charge per visit whether actually necessary or not.

In the prior art are switching valves as disclosed in U.S. Pat. No. 2,775,980 and 3,606,907 which include diaphragms. U.S. Pat. No. 2,138,988 discloses a switching valve with oppositely spring biased components which seat against inlet ports receiving pressure from different tanks. U.S. Pat. No. 2,389,667 shows bellows at 31–32 responsive to different pressure sources with bellows movement positioning a spindle to span and close a pair of needle valve orifices. U.S. Pat. No. 2,641,273 shows a switching valve for use in a carbonating system for beverages with a central valve stem and end mounted valves shifted axially in response to different tank pressures. Venting is via a loose fit between the valve stem and valve body. Gauges indicate tank pressure and cylinder in use indicator is provided.

SUMMARY OF THE PRESENT INVENTION

The present invention is embodied within a system for delivering a pressurized gas flow from multiple tanks or cylinders automatically selected by the system.

The present system includes a switching valve of the spool type responsive to first and second gas cylinder pressures and to internal means biasing the valve spool in an asymmetrical manner. Shut-off valves associated with each cylinder each include a spool responsive to opposed biasing means and cylinder pressure to direct or block a pressure flow to the switching valve. The shut-off valves serve to isolate their gas cylinder when a reduced pressure value is reached. Venting of the switching valve body is also accomplished via shut-off valve vents. A pressure gauge on the switching valve indicates the tank in use to facilitate tank replacement.

Important objectives of the present system include the provision of a system automatically switching to terminate gas flow from a used cylinder having an unacceptable pressure value and to provide a flow from a second or reserve cylinder or tank to extend the duration between cylinder replacement and hence reduce services costs and maintenance effort encountered by establishments using $CO_2$ carbonation systems; the provision of a system for automatically selecting a ga cylinder only when a reduced pressure is reached which effects a saving by avoiding premature changing of gas cylinders; the provision of a system using spool type valves for automatically switching to a second or reserve cylinder to preclude use of a $CO_2$ cylinder below an acceptable pressure; the provision of a system using shut-off valves which when closed permit venting of a switching valve to control opening and closing of same.

DETAILED DESCRIPTION OF THE PREFERRED EMBODIMENTS

Figure 1:
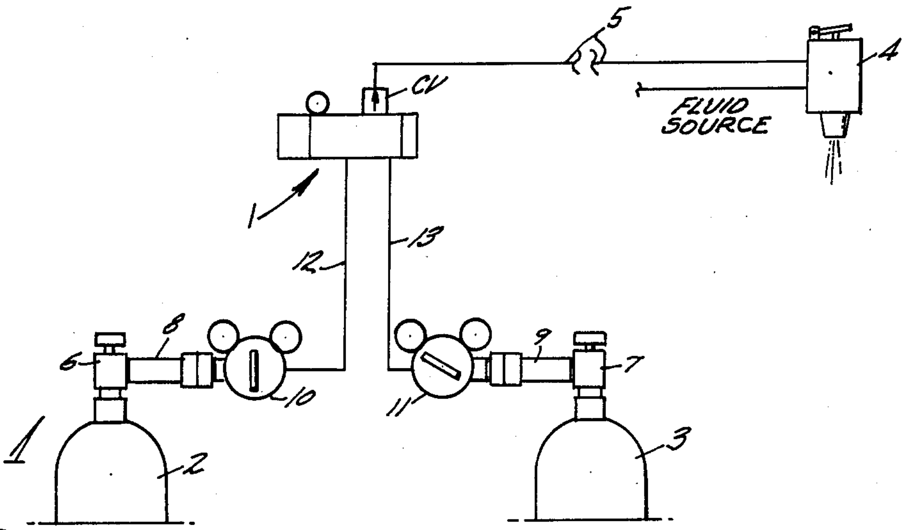
FIG. 1 is a schematic of the present system.

With continuing attention to the drawings wherein applied reference numerals indicate parts similarly hereinafter identified, the reference numeral 1 indicates generally a switching valve of the present system which serves to direct gas flow, in alternate fashion, from gas cylinders or tanks at 2 and 3 which may be of the type receiving $CO_2$. Switching valve 1 serves outlet means 4 via conduit means 5. Outlet means 4 may be a carbonator which also receives a liquid to be carbonated. A check valve is at CV.

Cylinders 2 and 3 are fitted with and include conventional manual control valves 6 and 7 which are normally open and closed only during cylinder replacement. Coupled by suitable means to valves 6 and 7 are shutoff valves at 8 and 9 of the present system. Pressure regulators at 10 and 11 with dual pressure gauges facilitate system use. Lines 12 and 13 serve switching valve 1.

Figure 2:
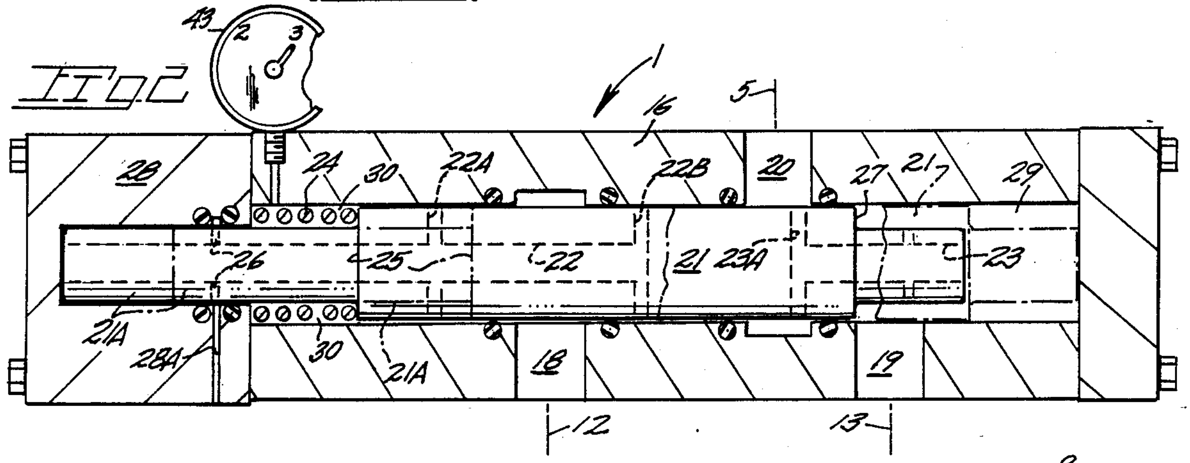
FIG. 2 is a longitudinal sectional view of the switching valve of the present system.
Figure 4:
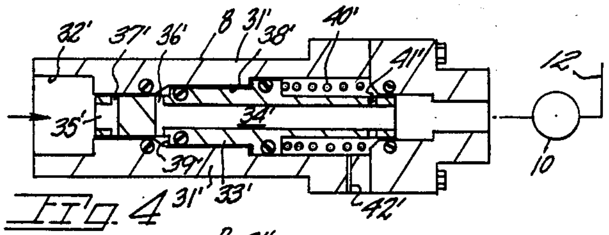
FIGS. 4 and 6 are longitudinal sectional views of shut-off valves associated with a remaining gas cylinder.

With continuing attention to switching valve 1, a valve body 16 defines inlet ports 18 and 19 and an outlet port 20. Valve 1 is of the spool type with a spool at 21 having axial passageways 22 and 23 with lateral passageways 22A, 22B and 23A. A helical spring at 24 abuts a valve end member 28 and a spool shoulder at 25 to bias the spool towards the right side of FIG. 2. Spring 24 is supplemented by gas pressure in a chamber 30 during spool travel which pressure acts on shoulder surface 25 with gas entry being via passageways 22A and ports 26 in a spool end segment 21A. A second or opposite spool shoulder is at 27. A second valve chamber is at 29 served by inlet port 19. An end member 28 is vented at 28A.

A description of shut-off valve 9 is applicable to both shut-off valves with prime reference numerals being used to identify like parts of shut-off valve 8 associated with cylinder 2. A valve body 31 has female threads at 32 to receive a nib (not shown) of manual control valve 7 or a suitable coupling thereon. A valve spool 33 has axially disposed passageways 34 and 35 each terminating inwardly in lateral bores at 36 and 37. A valve body chamber 38 permits communication between the bores and the passageways when pressure in cylinder 3 acts on the right-hand end of spool 33 and a spool shoulder 39 and is a value to overcome helical spring 40 which biases the spool in an opposite or closing direction. The spool is provided with vent bores 41 which vent conduit 13, inlet port 19 and chamber 29 of switching valve 1. In valve 8 vent bores 41′ would vent conduit 12, inlet port 18 and chamber 30 of switching valve 1. Shutoff valve vents 42–42' vent to the atmosphere. An indicator air gauge 43 includes a needle which indicates when chamber 30 is vented and tank 3 is in use.

Figure 3:
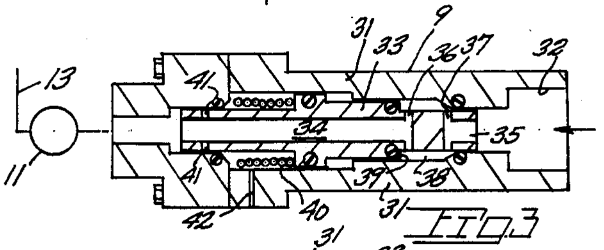
FIGS. 3 and 5 are longitudinal sectional views of shut-off valves associated with one gas cylinder.

In operation, switching valve 1 and shut-off valve 9 of FIG. 3 are shown with their respective spools positioned to direct gas flow from a new cylinder 3 at full pressure about 800 PSI. Cylinder 2 may be partially spent at this time and would, of course, be at a lesser pressure. Switching valve spool 21 will remain in its FIG. 2 position until pressure in cylinder 3 diminishes to a value that permits shut-off valve spool 33 to be shifted to closed-venting position by spring 40. Such shifting will vent chamber 29 of the switching valve to permit switching valve spring 24 to shift spool 21 to the right i.e., the broken line position of FIG. 2. Venting of chamber 29 of the switching valve body is provided by port 19, line 13, bores 41 in shut-off valve spool 33 and vent 42. Assuming partially used cylinder 2 has now been replaced with a new cylinder at full pressure to cause shut-off spool 33' of valve 8 to move to the FIG. 6 position whereat full pressure (as regulated at 10) is communicated to inlet port 18. Such pressure will be admitted to chamber 30 upon spool 21 and specifically lateral bores 22A reaching inlet port 18 and ports 26 reaching chamber 30 during spring 24 initiated travel to the right. Ultimately, both pressure in chamber 30 and the action of spring 24 maintain the spool in the broken line position. To complete one cycle, when tank 2 pressure is diminished its shut-off valve 8 will be closed by spring 40' to a closed-venting position whereat shut-off valve 8 serves to vent chamber 30 allowing switching valve spool 21 to shift back to the left or the full line position. Such venting of chamber 30 is via spool ports 26, lateral passageways 22A, inlet port 18, line 12, vent bores 41' and vent 42'. Vent 28A in the switching valve serves to vent any residual pressure in end member 28. Pressure from a new cylinder 3 will return spool 21 to the solid line FIG. 2 position with compression of spring 24.

Figure 6:
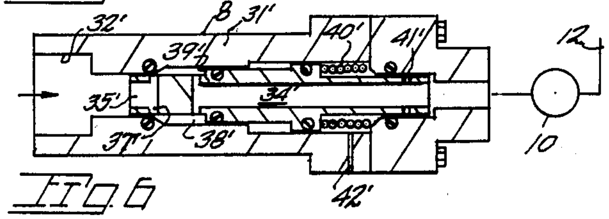
Figure 5:
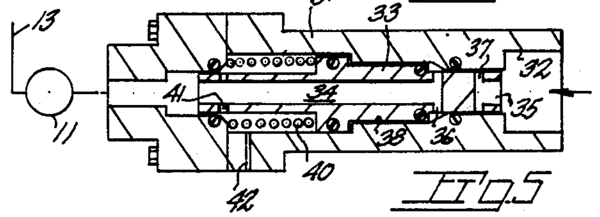

FIGS. 3 and 6 show the shut-off valves in a low pressure, closed venting position. When the present system is used as a carbonating system for beverages, the regulators 10 and 11 would be set at approximately 100 PSI. Shut-off valve spool movement to a low pressure, closed and venting position against the action of springs 40–40' would occur at tank pressure of about 120 PSI. Such venting, as above noted, permits switching valve spool movement.

While I have shown but one embodiment of the invention, it will be apparent to those skilled in the art that the invention may be embodied still otherwise without departing form the spirit and scope of the invention.

Having thus described the invention, what is desired to be secured by a Letters Patent is:

1. A system for automatically and alternately communicating pressurized sources such as gas cylinders with an outlet, said system comprising, shut-off valves one each in communication with one of said sources, said valves each having a spool, a switching valve including a spool, a valve body having inlet ports one each in communication with one each of said shut-off valves, an outlet port in communication with said outlet, spring means biasing said spool, conduit means between said shut-off valves and the switching valve, said shut-off valves each including a valve body, a spool having axial passageways, said shut-off valves each having a high pressure open position whereat gas cylinder flow is routed to said switching valve and a low pressure, closed and venting position whereat gas cylinder flow is blocked, vent means for venting said conduit means and said switching valve, means biasing the spool of each shut-off valve to said closed position upon reduced gas cylinder pressure in the shut-off valve, and said switching valve spool having multiple axially disposed passageways one each in alternate communication with one of said spool valves, means biasing the switching valve spool in one direction.

2. The system claimed in claim 1 wherein said shut-off valves are adapted at one end for cylinder attachment.

3. The system claimed in claim 1 wherein the axial passageways of each shut-off valve spool are axially offset from one another.

4. The system claimed in claim 3 wherein the shut-off valves each include a valve body defining a chamber for communicating the passageways of the valve spool.

5. The system claimed in claim 1 wherein said switching valve includes a source indicator pressure valve in communication with the valve interior.

6. The system claimed in claim 1 wherein said vent means includes ports in the shut-off valve spool and a vent in the valve body.

7. A system for communicating pressurized gas containers with a carbonating outlet, said system comprising, a switching valve having an outlet port in communication with said outlet, said valve having multiple inlet ports, a spool responsive to pressurized gas entering via said inlet ports, mechanical biasing means acting in a unidirectional manner on said spool, conduit means between said switching valve and shut-off valves, said shut-off valves one each for receiving a flow from one each of the containers and each having a valve spool and means biasing said spool to a closed venting position whereat said switching valve is vented to the atmosphere via said conduit means, the spool of each shut-off valve responsive to container pressure and urged thereby to an open non-venting position.

8. The system claimed in claim 7 wherein the switching valve spool defines multiple axial passageways.

9. The system claimed in claim 8 wherein said mechanical biasing means is a helical spring.

10. The system claimed in claim 7 wherein said switching valve includes an indicator responsive to gas pressure in said switching valve.

11. A system for directing gas flows from separate pressurized sources to an outlet, said system comprising, automatic shut-off valves one each associated with one each of said sources, said valves having a pressure biased open position and a spring biased closed-venting position, a switching valve having first and second chambers and a spool interposed therebetween, inlet ports one each serving one each of said chambers, an outlet port, said spool controlling gas flow through said ports, biasing means acting on the switching valve spool in a unidirectional manner, conduit means communicating said shut-off valves with said switching valve and the latter with said outlet, and said shut-off valves each including a vent whereby the first and second chambers of said switching valve may be vented to permit switching valve spool movement.

12. The system claimed in claim 11 wherein said shut-off valve each include a spool, spring means biasing the spool to the closed-venting position upon source pressure diminishing to a predetermined value.

13. The system claimed in claim 12 wherein said spool of each shut-off valve has axially disposed passageways.

14. The system claimed in claim 11 wherein the switching valve spool defines axially orientated passageways.

15. A system for directing gas flows from separate pressurized tanks to an outlet, said system comprising, shut-off valves for controlling tank flows and each including a spool having an open position for routing a tank flow through one of said valves and a closed-venting position, spring means shifting said spool to the closed-venting position at a predetermined tank pressure, a switching valve including a valve body having inlet ports and an outlet port, a spool controlling gas flow between said inlet ports and the outlet port, means unidirectionally biasing the switching valve spool, said valve body and spool of the switching valve defining switching valve chambers which when charged with tank pressure immobilize said spool, said shut-off valves each defining a vent opened and closed by the shut-off valve spool, said vent venting one of said chambers in the switching valve to permit shifting of the switching valve spool, conduit means communicating the shut-off valves with the switching valve and the latter with said outlet.

* * * * *